US008335145B2

(12) United States Patent
Ye

(10) Patent No.: US 8,335,145 B2
(45) Date of Patent: Dec. 18, 2012

(54) METHOD OF GENERATING MEMORY DISC IN OPTICAL DISC DRIVE

(75) Inventor: Janghae Ye, Seoul (KR)

(73) Assignee: Hitachi-LG Data Storage Korea, Inc., Seoul (KR)

( * ) Notice: Subject to any disclaimer, the term of this patent is extended or adjusted under 35 U.S.C. 154(b) by 29 days.

(21) Appl. No.: 12/912,086

(22) Filed: Oct. 26, 2010

(65) Prior Publication Data

US 2011/0096650 A1 Apr. 28, 2011

(30) Foreign Application Priority Data

Oct. 27, 2009 (KR) ........................ 10-2009-0102143

(51) Int. Cl.
*G11B 7/00* (2006.01)

(52) U.S. Cl. .................... 369/59.25; 369/53.1

(58) Field of Classification Search ............. 369/53.1, 369/53.21, 53.22, 59.25, 47.1, 53.24, 275.3, 369/27.27, 47.27
See application file for complete search history.

(56) References Cited

U.S. PATENT DOCUMENTS

| 4,707,750 | A  | * | 11/1987 | Anderson et al. ............... 360/60 |
| 6,667,939 | B1 | * | 12/2003 | Miyamoto ................. 369/53.21 |
| 7,177,990 | B1 | * | 2/2007  | Kahn et al. .................... 711/154 |
| 7,623,430 | B2 | * | 11/2009 | Suh ............................ 369/53.22 |
| 7,855,943 | B2 | * | 12/2010 | Tanaka ....................... 369/53.21 |

FOREIGN PATENT DOCUMENTS

KR 10-2002-0024763 A 4/2002

\* cited by examiner

*Primary Examiner* — Nabil Hindi
(74) *Attorney, Agent, or Firm* — KED & Associates, LLP

(57) ABSTRACT

A method of generating a memory disc in an optical disc drive is provided. A request for a change of an optical disc inserted in the optical disc drive into a memory disc is confirmed by detecting if a button included in the optical disc drive is operated. When the request is confirmed, the format of the optical disc may be changed. When an eject button is pushed in a predetermined pattern, for example, when the eject button is pushed for longer than a first reference time or pushed more than twice within a second reference time, the optical disc is initialized into a blank disc, file system data corresponding to the memory disc is recorded in a specific region of the blank disc according to ISO image generating program stored in a non-volatile memory included in the optical disc drive, and the blank disc is formatted.

9 Claims, 4 Drawing Sheets

METHOD OF GENERATING MEMORY DISC IN OPTICAL DISC DRIVE

BACKGROUND

1. Field

This document relates to a method of generating a memory disc in an optical disc drive connected to a host such that an optical disc can be used as a USB memory.

2. Related Art

An optical disc drive that records data on various types of optical discs such as CD and DVD or reproduces data recorded on the optical discs is widely spread and used.

The optical disc drive is connected to various types of hosts such as a personal computer through a serial AT attachment (SATA) interface or a universal serial bus (USB) interface to be used. However, optical discs cannot freely record or reproduce data, distinguished from a USB memory such as flash memory or memory stick.

To change an optical disc into a memory disc capable of freely recording and reproducing data, a user is required to perform a series of complicated menu selecting operations using an operating system (OS) or an application program of a host.

SUMMARY

An aspect of this document is to provide a method of changing an optical disc into a memory disc capable of freely recording and reproducing data in an optical disc drive irrespective of a host.

In an aspect, a method of generating a memory disc in an optical disc drive, comprising: detecting if a button included in the optical disc drive is operated to confirm whether there is a request for a change of an optical disc inserted in the optical disc drive into a memory disc; and changing a format of the optical disc when the request is confirmed.

It may be confirmed that the change of the optical disc into the memory disc is requested when it is detected that an eject button of the optical disc drive is operated in a predetermined pattern. The predetermined pattern may represent pushing the eject button for longer than a first reference time or pushing the eject button more than twice within a second reference time.

The operation of changing the format of the optical disc may comprise initializing the optical disc into a blank disc, recording file system data corresponding to the memory disc in a specific region of the blank disc and formatting the blank disc.

'No Disc' message may be transmitted to a host before the initializing operation and a message representing insertion of the memory disc may be transmitted to the host when the formatting operation is completed.

The operation of changing the format of the optical disc may be performed by ISO image generating software stored in a nonvolatile memory included in the optical disc drive.

In another aspect, an optical disc drive comprising a storage unit configured to store a program for changing an optical disc into a memory disc; a detector configured to detect an operation of a predetermined button in a predetermined pattern; and a controller configured to change format of the optical disc inserted in the optical disc drive to the format of the memory disc through the program stored in the storage unit when the predetermined pattern is detected by the detector.

Accordingly, an optical disc inserted into the optical disc drive can be easily changed into a memory disc such as a USB memory, and thus user convenience is improved.

BRIEF DESCRIPTION OF THE DRAWINGS

The implementation of this document will be described in detail with reference to the following drawings in which like numerals refer to like elements.

DETAILED DESCRIPTION

Hereinafter, an implementation of this document will be described in detail with reference to the attached drawings.

To use an optical disc as a USB memory capable of freely recording and reproducing data, all the data recorded on a rewritable optical disc inserted in an optical disc drive is deleted to initialize the optical disc into a blank disc according to an OS or application program of a host at the request of a user, and file system data corresponding to a memory disc is recorded on a specific region of the disc and the format of the disc is changed into the format of the memory disc through ISO (International Organization for Standardization) image generating software.

However, the operation of changing the format of the optical disc into the format of the memory disc is allowable only when the optical disc drive is connected to the host and requires a series of complicated menu selecting steps.

Accordingly, this document stores the file system data corresponding to a USB memory or the ISO image generating software in a memory of the optical disc drive and changes the optical disc into a memory disc capable of freely recording and reproducing data through a simple button operation.

A method of generating a memory disc according to this document can be applied to various types of optical disc drives connected to hosts including a personal computer, for example.

Figure 1:
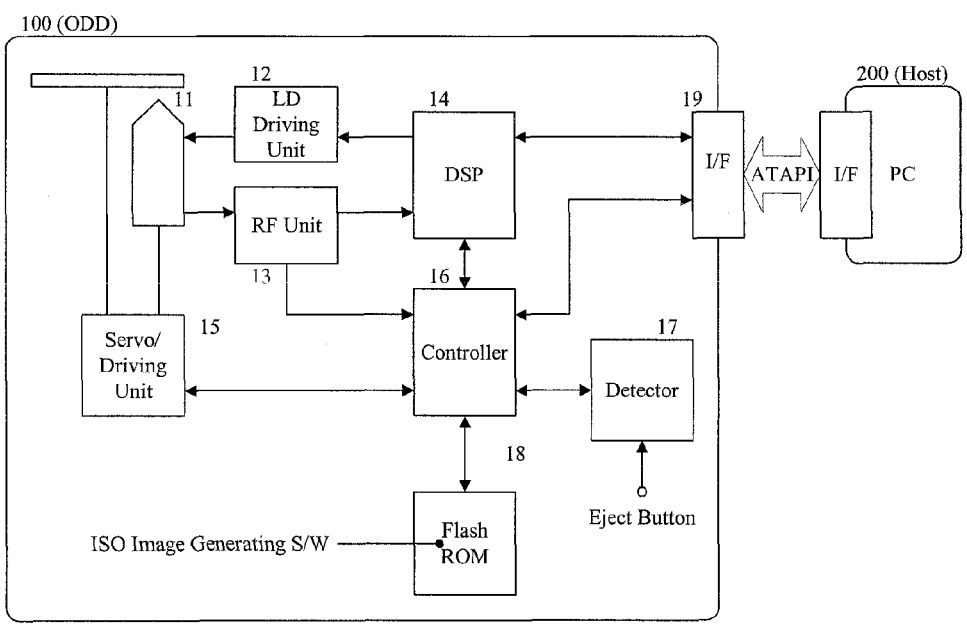
FIG. 1 is a block diagram illustrating a configuration of an optical disc drive to which this document is applied.

Referring to FIG. 1, an optical disc drive 100 to which this document is applied may include an optical pick-up 11, a spindle motor, a sled motor, a recording/reproducing unit driving the optical pick-up 11 and processing a servo signal and recording/reproduction data, a controller 16 controlling the recording/reproducing unit, a detector, a flash ROM 18, and an interface 19 connected to a host 200. The recording/reproducing unit may include an optical driving unit 12, an RF unit 13, a digital signal processor 14, and a servo/driving unit 15.

The optical driving unit 12 may be included in the optical pick-up 11.

The host 200 may include an interface, a CPU, a device controller, a flash ROM, a hard disc, a memory controller, and a RAM.

The flash ROM 18 of the optical disc drive 100 may use various types of nonvolatile memories such as EEPROM or external memory and stores file system data that allows an optical disc to freely add or remove data as a USB memory, for example, ISO image generating software that is an application program for changing a rewritable optical disc (for example, DVD-RW) into a memory disc.

The detector 17 detects if a specific button included in the optical disc drive 100, for example, an eject button, is operated in a predetermined specific pattern. For example, the detector 17 detects if the eject button is repeatedly pushed more than twice within a predetermined reference time or pushed for longer than a reference time.

The controller 16 deletes all the data recorded on the optical disc (for example, DVD-RW) to initialize the optical disc into a blank disc while the optical disc is inserted in the optical disc drive 100 when the detector 17 detects that the specific button is operated in the specific pattern.

Furthermore, the controller 16 executes the ISO image generating software stored in the flash ROM 18 to perform an operation of changing the blank disc into a memory disc, which will now be explained in detail.

Figure 2:
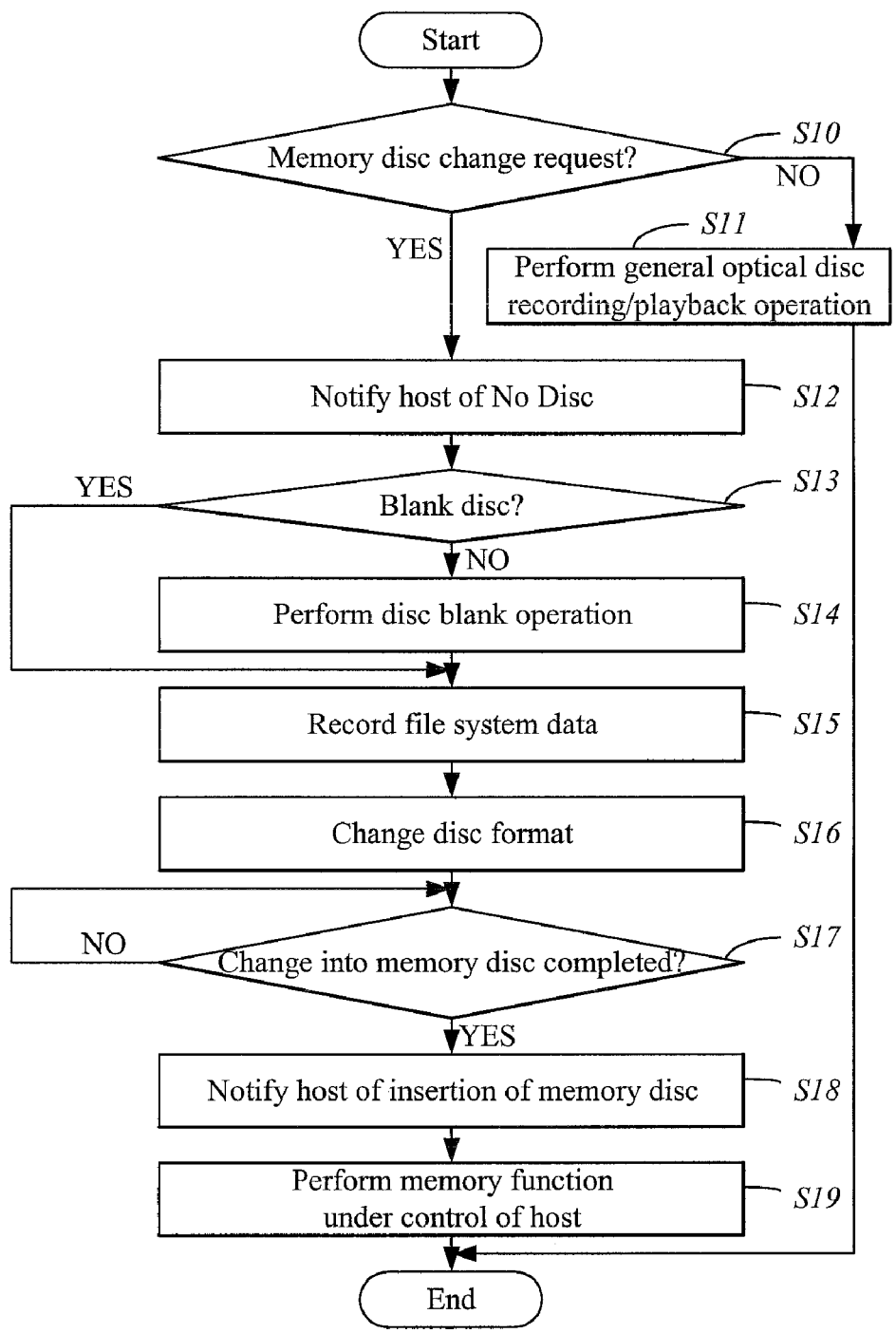
FIG. 2 is a flowchart illustrating a method of generating a memory disc in the optical disc drive shown in FIG. 1.

FIG. 2 is a flowchart illustrating an implementation of a method of generating a memory disc in an optical disc drive according to this document.

Figure 3:
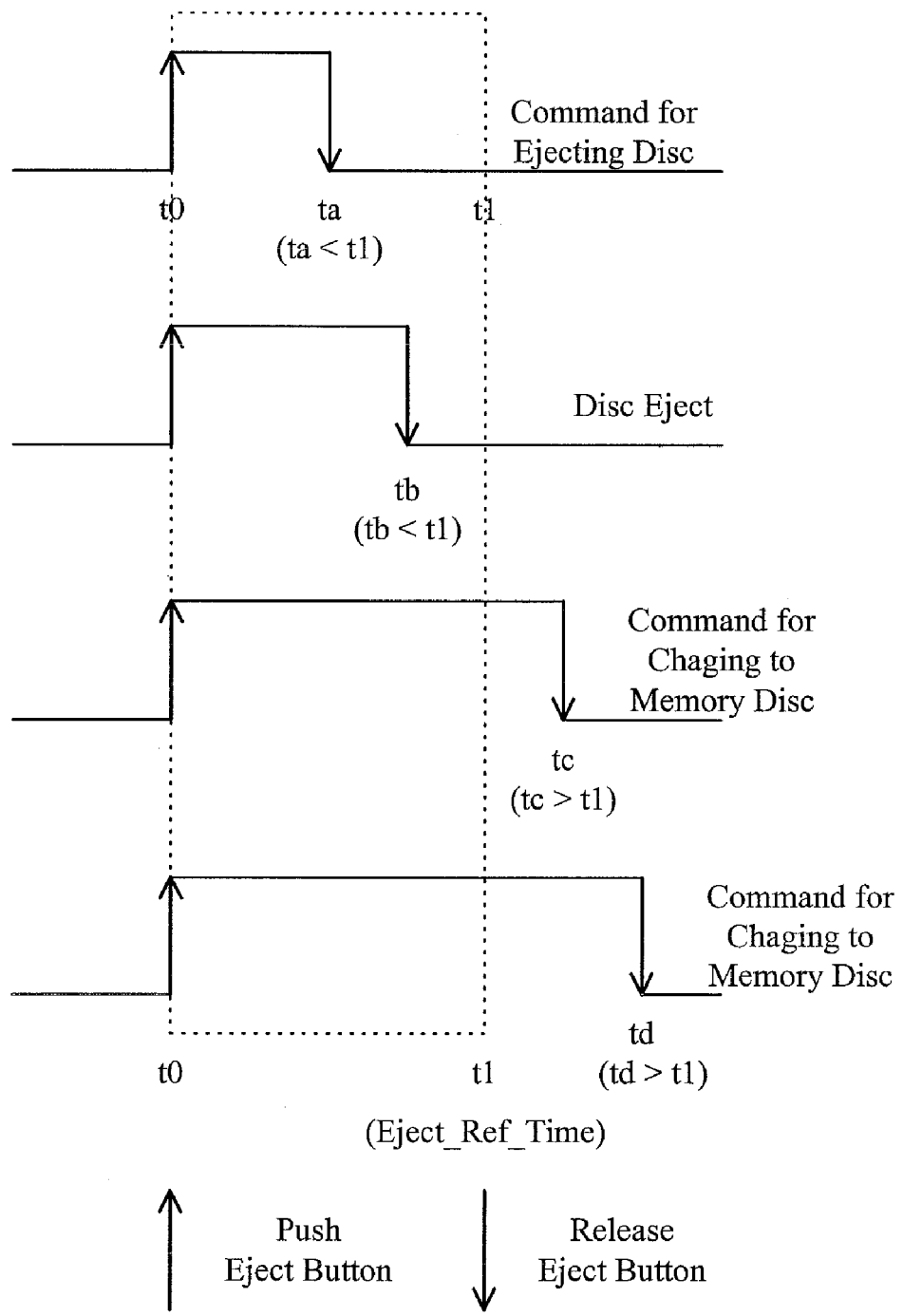
FIG. 3 illustrates an exemplary specific pattern of an eject button operation according to this document.

Referring to FIGS. 1 and 2, when a rewritable optical disc (for example, DVD-RW) is inserted in the optical disc drive 100, the controller 16 confirms whether there is a request for a change of the optical disc into a memory disc in operation S10. Here, the controller 16 controls the detector 17 to detect if the eject button, for example, is operated in a specific pattern. For example, if a user pushes the eject button of the optical disc drive 100 once (ta or Tb) within a predetermined reference time t1 (for example, 3 seconds), as shown in FIG. 3, the controller 16 determines that the pushing operation as a conventional disc eject request. If the user pushes the eject button for longer than a predetermined reference time (tc or td), the controller 16 determines that a change of the optical disc into the memory disc is requested.

When the operation of the eject button is not detected in operation S10, the controller 16 performs a general optical disc data recording or reproducing operation under the control of the host 200 connected through the interface 19 in operation S11.

When the change of the optical disc into the memory disc is requested in operation S10, the controller 16 transmits a message representing there is no optical disc (for example, No Disc) to the host 200 in operation S12. Then, the controller 16 controls the recording/reproducing unit to confirm whether data is recorded on the optical disc in operation S13.

When it is confirmed that the data is recorded on the optical disc, that is, the optical disc is not a blank disc, in operation S13, the controller 16 controls the recording/reproducing unit to perform a disc blank operation that deletes all the data recorded on the optical disc and initializes the optical disc into a blank disc in operation S14.

In addition, the controller 16 executes the ISO image generating software stored in the flash ROM 18 to record file system data corresponding to the memory disk in a specific region of the optical disc, for example, a lead-in region or the header of a data region, in operation S15 and changes the disc format of the optical disc to a disc format corresponding to the memory disc in operation S16. The operation of changing the blank disc into the memory disc is identical to the above-described conventional method performed by the OS or application program of the host so that detailed explanation thereof is omitted.

When the change of the optical disc into the memory disc through the aforementioned operations is completed in operation S17, the controller 16 transmits a message representing that the memory disc is inserted (for example, Memory Disc) to the host 200 in operation S18.

Furthermore, the controller 16 performs a memory function of recording audio data, video data and text data on the memory disc or reproducing data stored in the memory disc under the control of the OS or application program of the host 200 in operation S19.

Accordingly, the user can simply operate the eject button of the optical disc drive to easily change an optical disc inserted in the optical disc drive to a memory disc such as a USB memory.

Figure 4:
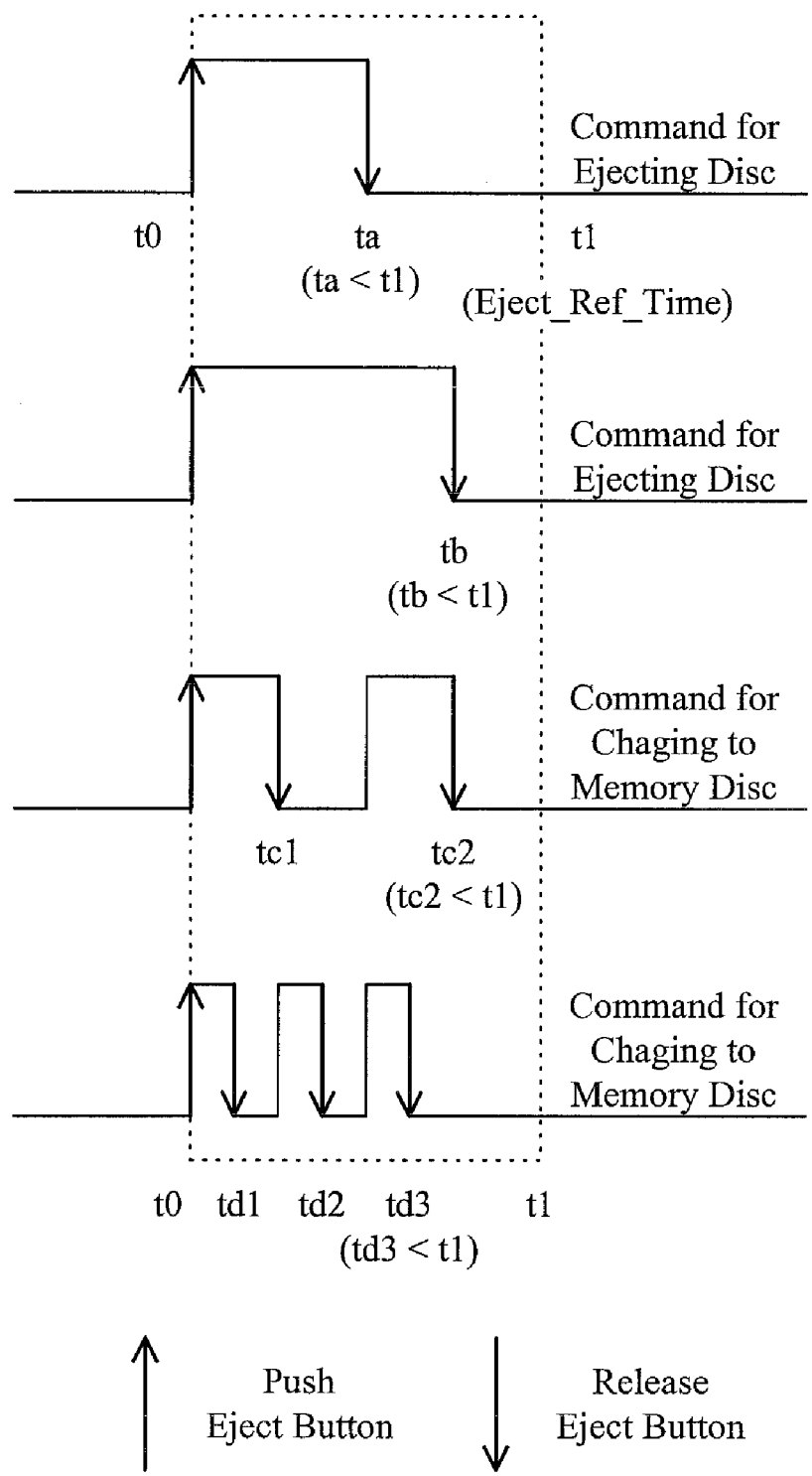
FIG. 4 illustrates another exemplary specific pattern of the eject button operation according to this document.

In another implementation according to this document, the user can repeatedly pushes the eject button more than twice within a predetermined reference time t1 (for example, one second), as shown in FIG. 4, to change the optical disc into the memory disc. Here, the reference time may be different from the reference time in the aforementioned implementation.

Other implementations are within the scope of the following claims.

What is claimed is:

1. A method of generating a memory disc in an optical disc drive, comprising:
   detecting if a button included in the optical disc drive is operated to confirm whether there is a request for a change of an optical disc inserted in the optical disc drive into a memory disc; and
   changing a format of the optical disc when the request is confirmed, wherein the operation of changing the format of the optical disc comprises initializing the optical disc into a blank disc, and recording file system data corresponding to the memory disc in a specific region of the blank disc, and
   wherein the operation of changing the format of the optical disc is performed by ISO image generating software stored in a nonvolatile memory included in the optical disc drive.

2. A method of generating a memory disc in an optical disc drive, comprising:
   detecting if a button included in the optical disc drive is operated to confirm whether there is a request for a change of an optical disc inserted in the optical disc drive into a memory disc; and
   changing a format of the optical disc when the request is confirmed,
   wherein the operation of confirming the request confirms that the change of the optical disc into the memory disc is requested when it is detected that an eject button of the optical disc drive is operated in a predetermined pattern.

3. The method of claim 2, wherein the predetermined pattern represents pushing the eject button for longer than a first reference time or pushing the eject button more than twice within a second reference time.

4. The method of claim 1, wherein the operation of changing the format of the optical disc further comprises transmitting 'No Disc' message to a host before the initializing operation.

5. The method of claim 1, further comprising transmitting a message representing insertion of the memory disc to the host when the formatting operation is completed.

6. An optical disc drive comprising:
   a storage unit configured to store a program for changing an optical disc into a memory disc;
   a detector configured to detect an operation of a predetermined button in a predetermined pattern; and
   a controller configured to change a format of the optical disc inserted in the optical disc drive to a format of the memory disc through the program stored in the storage unit when the predetermined pattern is detected by the detector,
   wherein the controller initializes the optical disc into a blank disc and records file system data corresponding to the memory disc in a specific region of the blank disc according to ISO image generating software stored in the storage unit.

7. An optical disc drive comprising:
a storage unit configured to store a program for changing an optical disc into a memory disc;
a detector configured to detect an operation of a predetermined button in a predetermined pattern; and
a controller configured to change a format of the optical disc inserted in the optical disc drive to a format of the memory disc through the program stored in the storage unit when the predetermined pattern is detected by the detector,
wherein the predetermined pattern represents pushing an eject button for longer than a first reference time or pushing the eject button more than twice within a second reference time.

8. The optical disc drive of claim 6, wherein the controller transmits 'No Disc' message to a host connected to the optical disc drive before the initializing operation.

9. The optical disc drive of claim 6, wherein the controller transmits a message representing insertion of the memory disc to the host when the formatting operation is completed.

* * * * *